United States Patent [19]
Thiermann

[11] 3,813,735
[45] June 4, 1974

[54] SNAP-ON ATTACHMENT FOR UTILITY SERVICE TRAILERS AND THE LIKE

[76] Inventor: William E. Thiermann, 10726 N. Wauwatosa Rd., Mequon, Wis. 53092

[22] Filed: July 3, 1972

[21] Appl. No.: 268,719

Related U.S. Application Data

[63] Continuation-in-part of Ser. No. 131,115, April 5, 1971, Pat. No. 3,734,590.

[52] U.S. Cl............ 24/201 SL, 296/37 R, 403/317, 403/353, 403/388
[51] Int. Cl............................................. F16b 19/00
[58] Field of Search............ 296/37 R, 28 K, 24 R; 24/201 A, 201 SL; 287/20.927, 20.92 C; 403/353, 317, 388

[56] References Cited
UNITED STATES PATENTS

| | | |
|---|---|---|
| 2,722,352 | 11/1955 | Dehnel.......................... 296/37 R X |
| 3,219,157 | 11/1965 | Gordon....................... 287/20.927 X |
| 3,326,595 | 6/1967 | Ogilvie.............................. 296/37 R |
| 3,381,925 | 5/1968 | Higuchi......................... 24/201 A X |

Primary Examiner—David Schonberg
Assistant Examiner—John A. Pekar
Attorney, Agent, or Firm—Andrus, Sceales, Starke & Sawall

[57] ABSTRACT

A plurality of spaced keyhole slots facing in the same direction are provided in one member, and the other member to be attached thereto is provided with correspondingly spaced and positioned headed projections adapted to be received through the larger portion of the slots and to interlock with said first member upon relative shifting between the members in a direction moving the headed projections into the smaller portions of the slots. A spring biased interlock retains the members against dislodgement of the projections from the slots until released.

2 Claims, 9 Drawing Figures

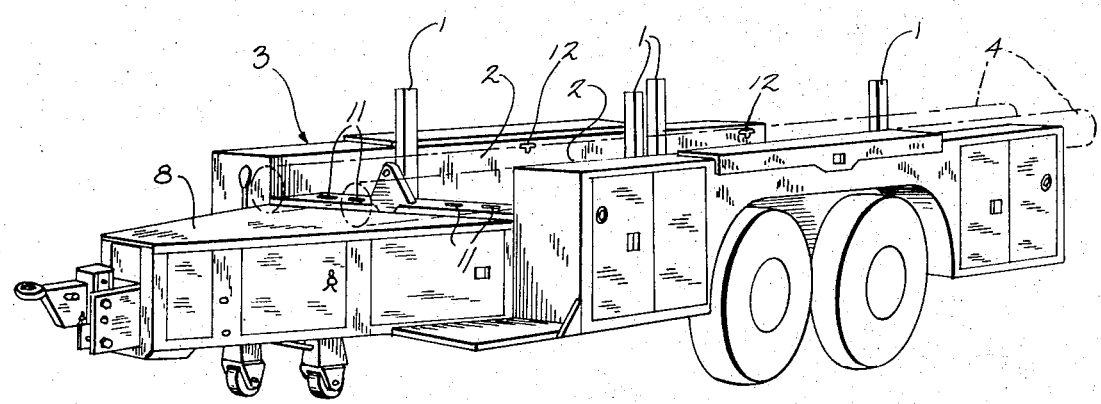
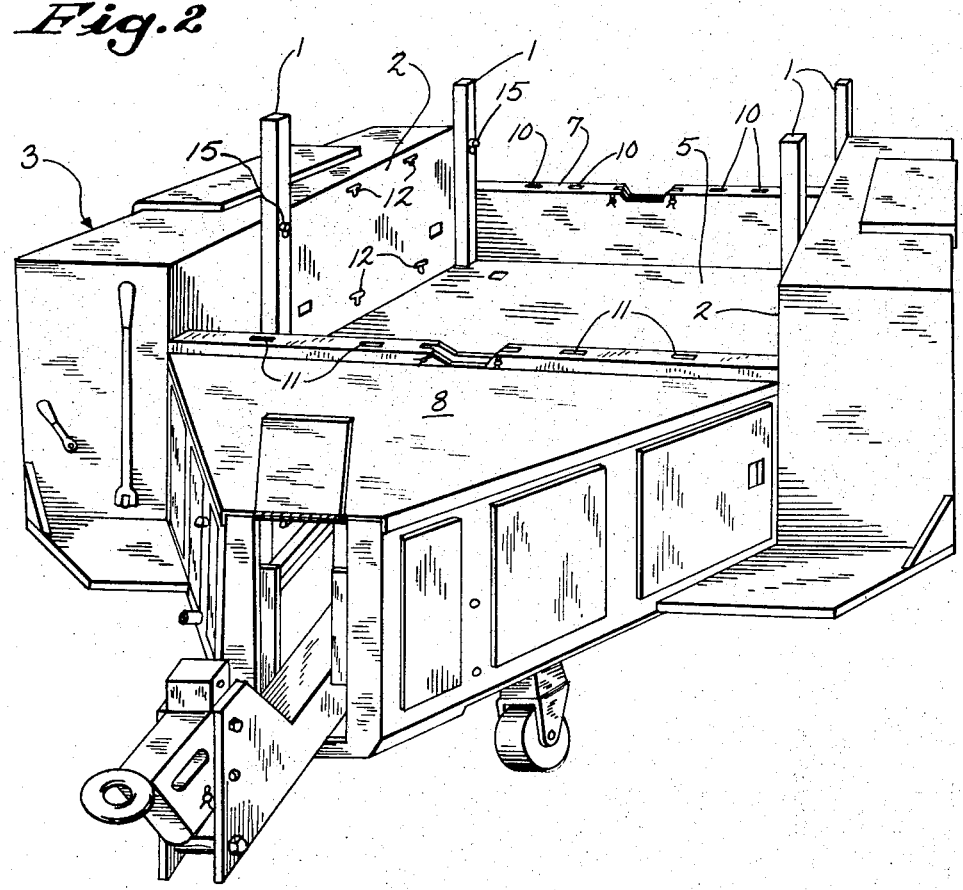

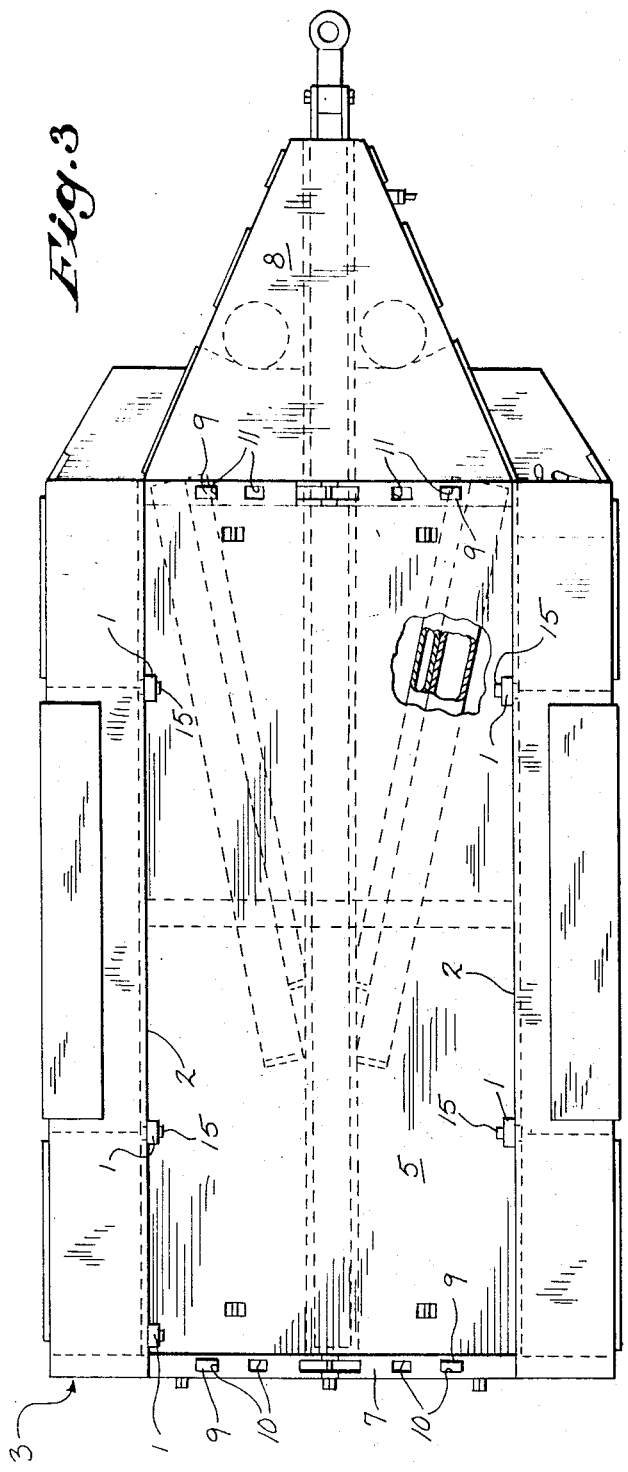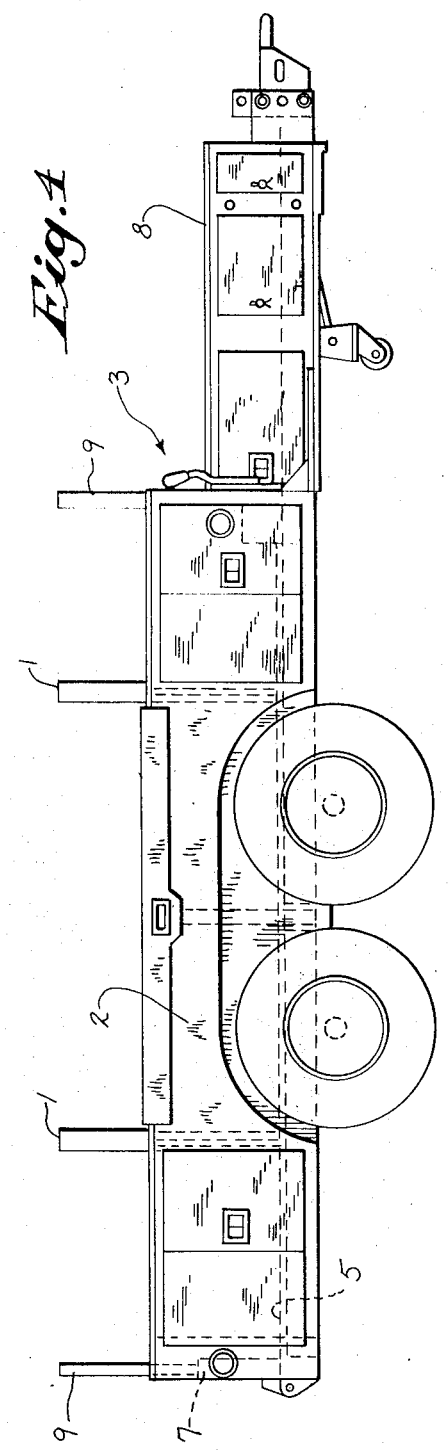

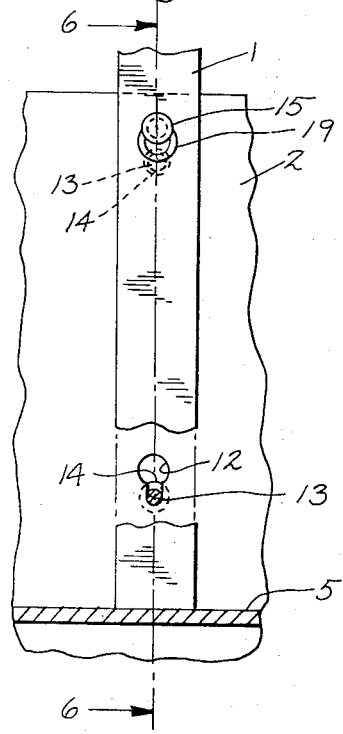
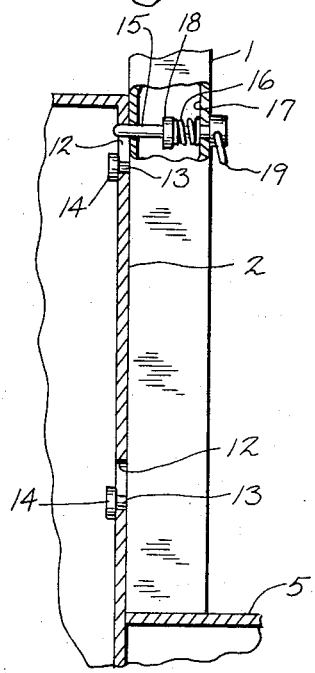
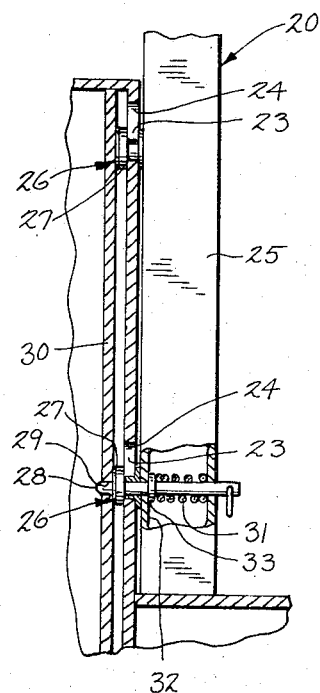
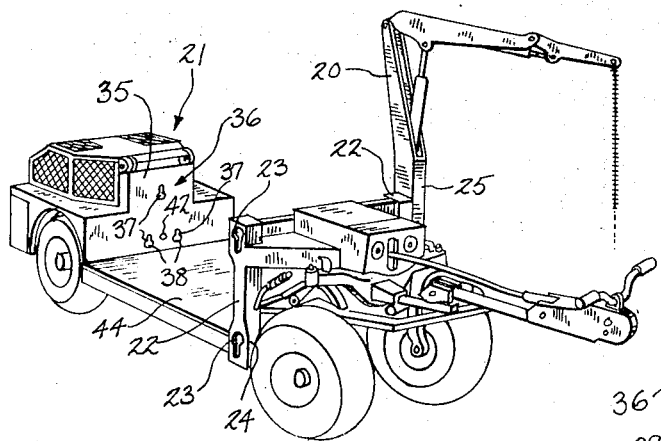
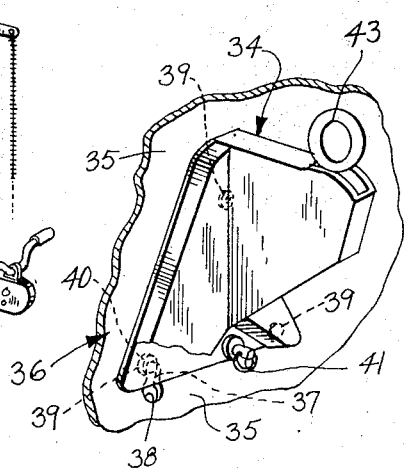

SNAP-ON ATTACHMENT FOR UTILITY SERVICE TRAILERS AND THE LIKE

CROSS REFERENCE TO RELATED APPLICATION

This application is a continuation in part of application Ser. No. 131,115 filed Apr. 5, 1971, now U.S. Pat. No. 3,734,540, for Utility Service Trailer.

BACKGROUND OF THE INVENTION

This invention relates to a snap-on attachment for utility service trailers and the like, and which has found particular advantage in the ready attaching of parts to be assembled in the field as in the case of stakes for truck or trailer hauling, booms and reels for utility power equipment and lift brackets for use in raising equipment into and out of utility trucks.

In most attachments employed for the above purposes heretofore it has been customary to bolt the assemblies together, thus requiring substantial loss of time of the workmen in the field since most assemblies for such purposes require frequent disassembly and reassembly, sometimes several times a day. Furthermore, the bolt threads become damaged and often create additional delay and cost.

SUMMARY OF THE INVENTION

The present invention provides a snap-on attachment for such assemblies which greatly saves the time of workmen and which is not susceptible of damage or loss by frequent use.

In carrying out the invention one of the members to be joined is provided with a plurality of spaced keyhole slots of the same size and facing in the same direction with the larger end of each slot extending generally in a direction opposite to the load or stress betweeen the members in service, and the other member is provided with a corresponding plurality of headed projections adapted to be assembled in the slots with the heads registering with and passing freely through the larger openings of the slots, whereupon shifting of the members in a direction of load or stress positions the heads behind the face of the first named member with the projections extending through the smaller portions of the slots.

The assembly is fixed against relative dislodgement of the members by a spring biased pin in one member registering with and entering a hole in the other upon completion of the assembly, which pin may be withdrawn against its spring to release the members, the pin generally being parallel to the axis of the projections.

In applying the attachment to removably secure a stake in a utility truck for instance, a vertical surface plate of the truck is provided with two vertically spaced keyhole slots having their larger portions directed upwardly and their smaller portions downwardly, and a stake is provided with two vertically spaced headed projections adapted to register with the larger portions of the corresponding keyhole slots and to enter through the same. Thereafter the stake can be dropped vertically to effect entry of the projections into the smaller lower ends of the keyhole slots whereby the heads on the projections will interlock behind the plate and secure the stake in place. The spring biased pin is carried by the stake preferably above one of the projections to enter and engage the upper end of the keyhole slot when the assembly is complete.

Similar application of the attachment may be made for booms, lifting brackets and other assemblies generally employed in field work by utility crews and the like.

BRIEF DESCRIPTION OF THE DRAWINGS

The drawings furnished herewith illustrate the best mode presently contemplated for carrying out the invention as described hereinafter.

In the drawings:

FIG. 1 is a perspective view of a utility trailer showing side stakes in place for carrying poles;

FIG. 2 is another perspective view of the trailer of FIG. 1 taken from a more forward and higher position;

FIG. 3 is a top plan view of the trailer as shown in FIG. 1;

FIG. 4 is a side elevation of the trailer;

FIG. 5 is a detail elevation showing a pair of key slots in the vertical wall of a cabinet with a stake secured therein;

FIG. 6 is a vertical central section taken on line 6—6 of FIG. 5 and with a stake secured in place by the key slots;

FIG. 7 is a view similar to FIG. 6 showing a modified lock construction employed for attaching a boom to a trailer or dolly frame;

FIG. 8 is a perspective view of a dolly adapted to carry a boom, and showing a boom attached on the far side thereof; and FIG. 9 is a detail perspective view showing the lifting bracket as attached to the dolly of FIG. 8, with parts broken away and sectioned to show the attachment.

DESCRIPTION OF THE PREFERRED EMBODIMENTS

Referring to the embodiment of FIGS. 1 to 6, inclusive, the attachment is employed to secure a plurality of upstanding stakes 1 to a vertical frame member or side wall 2 of a utility trailer 3 adapted to haul line poles 4 shown in phantom in FIG. 1.

The trailer 3 is described in more detail in the application referred to above, and generally comprises a body having a floor 5 with upstanding cabinets along each side and which provide inwardly facing vertical walls 2 for confining materials carried on floor 5.

The tailgate 7 and a front deck 8 level with the upper edge of the tailgate are constructed to carry utility poles 4 loaded longitudinally of the trailer at a level above the floor 5.

For this purpose stakes 9 may be removably dropped into selected recesses 10 in tailgate 7 and 11 in the front deck to confine the poles laterally.

The present invention is concerned more particularly with the attachment of stakes 1 to the vertical walls 2 as shown in detail in FIGS. 5 and 6.

For this purpose a pair of vertically spaced keyhole slots 12 are provided at suitable locations in walls 2 with the larger openings of the slots at the upper ends thereof.

Each stake 1 has a pair of longitudinally spaced projections 13 with heads 14 thereon extending from one side of the stake and adapted to be inserted through the upper enlarged end of the corresponding keyhole slot 12, after which the stake is dropped to a position where heads 14 are confined behind the smaller ends of the corresponding keyhole slots 12 to thereby interlock the stake in place.

A spring pressed pin 15 extends through each stake 1 at a position where its normally projecting end enters the upper end of one of the keyhole slots 12 to prevent accidental raising of the stake and release thereof from wall 2.

When it is desired to remove a stake 1, the pin 15 is pulled outwardly against its spring 16 to disengage the pin from wall 2, after which the stake may be raised until heads 14 register with the larger upper opening of the corresponding slots for release therethrough.

For this purpose the spring 16 may be a coil spring with pin 15 extending axially therethrough, and the spring may be confined between the inner front wall abutment 17 of stake 1 and a washer 18 fixed on the pin.

A suitable ring 19 may be secured on the exposed end of pin 15 to facilitate manual actuation of the pin.

When the stake 1 is thus assembled with and secured to wall 2 the stake is rigidly held against displacement in all directions within the limit of strength of the attaching parts.

The ease with which the attachment can be made and the disassembly can be accomplished saves a great deal of time and labor on the part of the utility crew.

In FIGS. 7 and 8, the attachment is employed to removably mount a boom 20 on a utility trailer or dolly 21.

For this purpose, the upstanding post 22 on dolly 21 is of hollow tubular design and has two vertically spaced keyhole slots 23 in one side thereof.

The keyhole slots 23 are arranged with the banjo or larger portion 24 at the upper end thereof as were the slots 12 in the previous embodiment.

The boom 20 has a vertical post 25 with a pair of projections 26 thereon spaced to correspond with slots 23.

Each projection 26 has an enlarged head 27 which is adapted to pass through the banjo opening 24 of the corresponding slot 23 and to engage behind the side wall of post 22 when the projection moves downwardly to the bottom of the slot.

In order to prevent accidental lifting and release of the boom, a pin 28 may extend through the post 25 axially of one projection 26 for registry in a hole 29 in a plate 30 secured in post 22 behind slot 23 when the projection is disposed at the bottom end of the slot.

A compression spring 31 is mounted on pin 28 between an inner wall abutment 32 of post 25 and a washer 33 fixed on the pin to bias the latter inwardly toward locking position at all times.

The attachment of the boom 20 as described provides a rapid assembly and disassembly of the same upon the dolly 21 by a utility crew.

In FIGS. 8 and 9, another embodiment of the invention is illustrated in the attachment of the lifting bracket 34 to the forward face plate 35 of the power unit 36 on dolly 21.

In this embodiment three keyhole slots 37 are disposed in plate 35 with their larger banjo ends 38 downwardly thereof as shown in FIG. 8, and arranged triangularly with one at the top and two laterally spaced at the bottom.

The bracket 34 has three projections 39 thereon spaced corresponding to slots 37 to register therewith, each projection 39 having a head 40 disposed to enter through the lower banjo end 38 of the corresponding slot and to engage behind plate 35 when bracket 34 is raised to operative position with projections 39 at the upper smaller ends of slots 37.

A suitable spring biased pin 41 is disposed midway between the lower projections 39 on bracket 34 to register with and enter a hole 42 provided in plate 35 for that purpose when the bracket is raised to operative position.

The bracket 34 has a lifting ring 43 secured thereto at a centrally balanced position for the dolly, to facilitate lifting of the dolly by a crane on a utility truck or trailer.

Removal of bracket 34 when the dolly is in service clears the deck 44 of the dolly for use in transporting transformers and other objects.

The attachment may be additionally and similarly employed for various items of equipment used by utility crews such as line stringing equipment, reels, stanchions and the like.

Various modes of carrying out the invention are contemplated as being within the scope of the following claims particularly pointing out and distinctly claiming the subject matter which is regarded as the invention.

I claim:

1. In a device of the class described, a side wall member having at least one keyhole slot therein, a backing member spaced behind said side wall member and having a small hole therethrough behind the smaller end of said slot, an operable member adapted to be secured to said wall member and having a projection of a size generally fitting the small end of said slot, a head upon the end of said projection adapted to enter through the larger end portion of said slot and to interlock behind said wall member in the space between said wall member and said backing member when the operative member is shifted to move the projection thereon into the smaller end portion of the slot, and pin means extending axially through said projection and the head thereon into said small hole in said backing member to lock said operable member against release from said wall member.

2. The construction of claim 1 and spring means carried by said operable member to bias said pin into interlocking relationship with said backing member.

* * * * *